United States Patent Office 3,420,788
Patented Jan. 7, 1969

3,420,788
INCLUSION RESINS OF CYCLODEXTRIN AND METHODS OF USE
Jurg Solms, Vevey, Switzerland, assignor to Afico S.A., Lausanne, Switzerland, a corporation of Switzerland
No Drawing. Filed Apr. 20, 1965, Ser. No. 449,619
Claims priority, application Switzerland, Apr. 29, 1964, 5,615/64
U.S. Cl. 260—17.4      14 Claims
Int. Cl. C08b 19/00; C08f 29/50; B01d 15/00

ABSTRACT OF THE DISCLOSURE

This invention relates to the manufacture of inclusion resins which have the ability to include inorganic and organic compounds of specific shape within the specifically shaped lumens and bores of the molecular structure of the inclusion resins. The inclusion resins of the present invention are water insoluble, can be prepared by various means, and can be used for selective separation of substances from each other.

---

By the term "inclusion resins" are meant resinous, water-soluble substances which have the property of forming inclusion complexes.

A number of carbohydrates are capable of forming inclusion complexes with low-molecular compounds. The carbohydrates possessing this property have hollow spirally-shaped or cylindrical molecules having the ability of molecularly including within their lumens or bores a variety of inorganic or organic compounds. The resulting inclusion complexes are made up of two distinct components, the host molecule and the guest molecule.

The forces binding the host and guest molecules are of the Van der Waals type, that is physical rather than chemical. However, the complexes are fairly stable, and the guest molecules are protected, for example, from enzymatic or oxidative attack, and in general have reduced volatility.

Nevertheless, the inclusion complexes formed with carbohydrates as hosts have limited applications, principally because they are water soluble. Thus, since such complexes are usually prepared in an aqueous medium, considerable difficulties are encountered when it is desired to isolate the complex from the reaction medium.

An object of the present invention is to provide stable water-insoluble inclusion resins.

A further object of the invention is to provide processes for the preparation of such resins.

The present invention accordingly provides water insoluble inclusion resins having cyclodextrin-like properties of forming inclusion complexes with organic and inorganic substances.

A feature of the inclusion resins according to the invention is that in the formation of inclusion complexes, the resins are selective, in that the guest molecules are entrapped according to their shape, and not by charge or molecular weight. Thus one application of the resins is a novel type of chromatography, whereby two or more structural isomers may be separated by using a resin which specifically includes only one of the isomers.

The inclusion resins according to the invention may be conveniently prepared by various methods. A further feature of the invention is a process for the preparation of said resins which comprises cross-linking a carbohydrate which either possesses cyclodextrin-like inclusion properties or which is capable of forming inclusion complexes after cross-linking with a bifunctional compound. The resulting resin is insoluble in water and has the above-mentioned desirable inclusion properties.

Various carbohydrates may be used as starting materials for preparing the inclusion resins. Particularly suitable are cyclodextrins ($\alpha$, $\beta$, $\gamma$, etc.) and mixtures of cyclodextrins; alternatively acyclic dextrins and related starch compounds, such as amylose, may also be used. The examples given above should not be construed as limiting, however, since the condition which the carbohydrate materials should satisfy is that either they have inclusion properties which they retain after cross-linking or that they acquire inclusion properties as a result of the cross-linking.

The bifunctional compound which is used as cross-linking agent should be one which is capable of reacting with the hydroxyl groups of the carbohydrate. Of the numerous classes of substances which are capable of reacting with hydroxyl groups, preferred classes for use as cross-linking agents are compounds containing reactive halogen, particularly chlorine, atoms and epoxy compounds. Especially suitable compounds are epichlorohydrin, dichlorohydrin, diepoxy-butane, diepoxy-propyl ether, ethylene glycol diepoxy-propyl ether and related compounds. Formaldehyde is also a useful cross-linking agent.

Conditions under which the cross-linking reaction is carried out will depend on the reactants used and also on the properties desired for the resin. For example, when the cross-linking agent is a compound containing epoxy groups, it is preferred to conduct the reaction in a slightly alkaline medium. It is advantageous to effect the cross-linking in a solvent medium, preferably one in which at least one of the reactants is soluble. Water is a suitable solvent, but organic solvents such as formaldehyde, dimethylformamide and similar compounds may also be used with advantage.

The relative quantities of the carbohydrate and cross-linking agent to be used will also depend on the desired properties of the resin, the cross-linking agent and on the reaction conditions. Thus, for example, when the reaction is effected in aqueous solution using an epoxy compound as cross-linking agent, it is preferred to employ 0.5 to 20 parts by weight of epoxy compound for each part by weight of carbohydrate, such as a cyclodextrin or a mixture of different cyclodextrins.

Upon mixing of the reactants, a certain amount of heat is evolved, but thereafter it is preferred to maintain a temperature of 30 to 90° C. Generally, a reaction time of 3 to 20 hours is sufficient. If the cross-linking agent is sensitive to oxygen, it is preferred to carry out the reaction under an inert gas, such as nitrogen or carbon dioxide.

When formaldehyde is used as cross-linking agent, an acid reaction medium (pH about 1) is preferred. This may be obtained by adding appropriate quantities of an acid such as hydrochloric or sulphuric acid. Preferably, the carbohydrate starting material is dissolved in a 5–40% formaldehyde solution. In this case no solvent is required. Inclusion resins having the useful properties indicated above may be prepared by using 0.25 to 10 parts by weight of formaldehyde per part by weight of carbohydrate material. The time of this reaction is usually from 5 to 30 hours, depending on the specific conditions selected.

A further method of preparing the inclusion resins according to the invention is by imbedding a carbohydrate having cyclodextrin-like inclusion properties in a matrix of a water insoluble polymeric substance. Examples of preferred polymeric substances are polyamides, polyvinyl acetate, epoxy resins, nitrocellulose, acetyl cellulose, ethyl cellulose, polyacrylamide, polymethacrylamide and the polyacrylates and polymethacrylates.

For the preparation of the resins wherein the complex-forming carbohydrate is imbedded in an insoluble matrix, any method which leads to a uniform distribution of the carbohydrate throughout the matrix may be used.

For example, the polymeric substance forming the matrix may be dissolved in a solvent therefor, for example acetone, ethyl acetate or butyl acetate, and the carbohydrate thoroughly dispersed in the solution. Thereupon, the solvent may be removed, for example by evaporation, and one thus obtains the inclusion resins in solid state, which may then be powdered and/or further dried before use. The choice of solvent to be used will, of course, depend on the nature of the polymeric substance used; the solvent should furthermore be inert with respect to the carbohydrate.

Alternatively, the carbohydrate may be dispersed in a suitable polymerisable monomer or monomer mixture, and the monomer then polymerized, if desired with use of a polymerization initiator and/or catalyst. Suitable proportions of polymeric substance to carbohydrate are 1:1 to 100:1 parts by weight.

A further feature of the present invention are derivatives of the inclusion resins described above. It has been found that it is possible to modify the structure of the resins without affecting their inclusion properties, thus obtaining further inclusion resins having different reaction properties. Such derivatives may be formed by chemically modifying the structure of the inclusion resins with various reagents. For example, cyclodextrin-containing resins may be modified by oxidation, e.g. with periodates. The oxidation leads to the formation of aldehyde groups in place of the secondary hydroxyl groups of the carbohydrate. Such products are especially useful as sulphite scavengers and are stable to alkalis. If desired, the oxidized resin may be treated with hydroxylamine, resulting oxime-type reaction products which possess a marked affinity for metal ions. The structure of the oxidized resins may also be modified by a reduction reaction, for example with sodium borohydride or lithium aluminum hydride. The oxidized resins may, if desired, be further modified, for example by a second oxidation with a mild oxidizing agent such as sodium chlorite, yielding dicarboxyl derivatives which form stable salts with heavy-metal ions. These resins are thus also capable of acting as highly specific ion-exchange resins.

The inclusion resins according to the invention may be used for various purposes. For example, inclusion complexes may be formed between the resins and specific compounds which are present in admixture with other compounds. One may proceed by simply adding the resin, in powdered or granular form, to a solution containing the desired substance and the mixture allowed to reach equilibrium conditions. Alternatively, the separation may be effected in a column, employing selected temperature, pH and/or solvent gradients, the resin including the guest molecule according to its shape. The inclusion complex may then be removed, for example by filtering or decanting and the substance recovered from the complex as desired, for example by heating to elevated temperatures or by steam distillation.

Alternatively, the inclusion complexes may be formed by passing a solution containing the desired substance through a column of the inclusion resin.

A further application of the inclusion resins according to the invention is for the stabilization of volatile and/or unstable substances such as vitamins and volatile constituents of aromatic substances present in foodstuffs.

The following examples are given for the purpose of illustration only.

Example 1

35 gr. of a mixture of homologous cyclodextrins (containing principally β-cyclodextrin) are mixed with 15 ml. of water. 37.5 ml. of hot 50% sodium hydroxide solution are added whilst the suspension is stirred. 40 gr. of epichlorohydrin are then added and the mixture is stirred until a stable emulsion is obtained, which solidifies at about 20–25° C. The mass is maintained at this temperature for 15 hours and then at 50° C. for 5 hours. Finally, it is ground under acetone, washed with acetone and water to neutrality, washed again with acetone and dried in a vacuum. A stable white powder, capable of absorbing 1 to 3 times its weight of water, is obtained.

Example 2

20 gr. of a mixture of homologous cyclodextrins (containing principally β-cyclodextrin) are carefully mixed with 5 gr. of 40% aqueous formaldehyde and 2 gr. concentrated hydrochloric acid. The mixture, which solidifies after several hours, is maintained at 20–25° C. for 20 hours. It is then heated at 60° C. for 3 hours, ground under water and dried.

A white powder, capable of absorbing 0.5 to 1.5 times its weight of water, is obtained.

Example 3

20 gr. of commercial soluble dextrin are mixed with 50 ml. of water and 8 ml. of 6 M sodium hydroxide. The mixture is stirred vigorously and 8 gr. of epichlorohydrin are added. Stirring is continued and the temperature is maintained at 80° C. for 2 hours until a homogeneous emulsion is obtained. The emulsion solidifies slowly to a gel, which is maintained at 70° C. for 15 hours. It is also possible to carry out the reaction under nitrogen, with addition of a small quantity of a reducing agent to avoid oxidative side reactions.

The solidified gel is then ground under ethanol, washed well with ethanol and then water to neutrality and finally rinsed with water and dried.

A stable white powder, capable of absorbing 2 to 6 times its weight of water, is obtained.

Example 4

20 gr. of pure amylose are dispersed in 50 ml. of water. Then 20 ml. of 5 M sodium hydroxide and 6 gr. of epichlorohydrin are added with stirring, the mixture is homogenized at 12° C. and maintained at this temperature until it solidifies. The resulting gel is heated at 80° C. for 2 hours and then at 60° C. for 15 hours. Finally, the solidified gel is finely ground and washed as described in Example 3.

Example 5

1 gr. of a mixture of homologous cyclodextrins (containing principally β-cyclodextrin) is carefully mixed with a 30% solution of acetyl cellulose in acetone. The suspension is spread out on a glass plate to evaporate the acetone and the film ground finely and dried in a vacuum.

The product thus obtained has a negligible water-absorption capacity but contains about 80% of the original cyclodextrin in active form.

Example 6

1 gr. of the inclusion resin prepared as described in Example 1 is immersed in 50 ml. water containing 80 μmol of Congo red and the mixture is maintained in equilibrium for 20 hours.

On analyzing the solution, it is found that only 4 μmol of Congo red remain in solution whereas 76 μmol are absorbed by the resin.

Example 7

1 gr. of the inclusion resin prepared as described in Example 1 is immersed in 50 ml. water containing 140 μmol of p-nitrophenol and the mixture is maintained in equilibrium for 20 hours with stirring.

An analysis of the mixture shows that 92 μmol of the p-nitrophenol are absorbed by the resin and 48 μmol remain in solution.

Example 8

1 gr. of an inclusion resin having cyclodextrin structure, prepared as described in Example 1, are immersed in 50 ml. water containing 140 μmol of o-nitrophenol. The mixture is maintained in equilibrium for 20 hours with stirring. After this time, it is found that 50 μmol of o-nitrophenol are absorbed by the resin and 90 μmol remain in solution.

Example 9

1 gr. of an inclusion resin prepared as described in Example 1, is immersed in 50 ml. of water containing 80 μmol of benzaldehyde. The mixture is maintained in equilibrium for 20 hours with stirring. 30 μmol of benzaldehyde are absorbed by the resin and 50 μmol remain in solution.

Example 10

1 gr. of an inclusion resin prepared as described in Example 4, is immersed in 50 ml. of potassium iodide solution containing 750 μmol of iodine. The mixture is maintained in equilibrium for 20 hours with stirring. 700 μmol of iodine are absorbed by the resin and 50 μmol remain in solution.

Example 11

1 gr. of an inclusion resin prepared as described in Example 2, is immersed in 50 ml. of a potassium iodide solution containing 800 μmol of iodine. The mixture is maintained in equilibrium for 20 hours with stirring. 500 μmol of iodine are absorbed by the resin and 300 μmol remain in solution.

Example 12.—Separation of o- and p-nitrophenol using an inclusion resin 5 gr. of an inclusion resin prepared as described in Example 1, are placed in a column approximately 20 cm. high. The column is equilibrated at 50° C. with a phosphate buffer (pH 8). 10 ml. of a solution containing 0.05% w./v. of o-nitrophenol and the same quantity of p-nitrophenol are poured in at the top of the column, followed by phosphate buffer at 50° C.

When 80 ml. of buffer have been added, the o-nitrophenol fraction emerges in 90 ml. of eluate. The column is then warmed to 80° C. and the same eluent is added. The p-nitrophenol fraction is obtained when about 180 ml. of eluate are collected at the base of the column.

Example 13.—Separation of phenylalanine and tryptophane using an inclusion resin 8 gr. of an inclusion resin prepared as described in Example 1, are placed in a column about 30 cm. high and the column equilibrated with water. 3 ml. of a solution containing 0.05% w./v. of L-phenylalanine and the same quantity of L-tryptophane are poured in at the top of the column which is then washed with water at ambient temperature. 5 ml. fractions are collected at the base of the column. Pure L-phenylalanine is obtained in fractions 5 to 7 whereas fractions 9 to 16 contain pure L-tryptophane.

Example 14.—Oxidation of an inclusion resin 7 gr. of an inclusion resin prepared from cyclodextrin and epichlorohydrin are immersed in a solution containing 3% w./v. of sodium chloride and 200 ml. of 0.4 M sodium periodate. The reaction mixture is maintained in the dark for 24 hours at 4° C. The resulting dialdehyde derivative of the resin is washed with ethylene glycol and freed from iodate with water. Finally, it is washed with acetone and dried under vacuum.

1 g. of the oxidized resin is immersed in 100 ml. of 0.1 N bisulphite solution. When equilibrium is reached, the resin has absorbed 5 milliequivalents (that is more than 50%) of the bisulphite present.

I claim:

1. Cyclodextrin cross linked with a bifunctional compound reactable with the hydroxyl group of a carbohydrate, said cross linked cyclodextrin being water insoluble and being capable of forming inclusion complexes.

2. Cross linked cyclodextrin according to claim 1 wherein the cyclodextrin is cross linked with a compound selected from the group consisting of epichlorohydrin, dichlorohydrin, diepoxy-butane, diepoxy-propyl ether, ethylene glycol diepoxy-propyl ether and formaldehyde.

3. A water insoluble inclusion resin, comprising a water insoluble polymer having a cyclodextrin embedded therein.

4. Inclusion resin according to claim 3 wherein said water insoluble polymer is selected from the group consisting of polyamide, polyvinyl acetate, epoxy resins, nitrocellulose, acetyl cellulose, ethyl cellulose, polyacrylamide, polymethacrylamide, polyacrylates and polymethacrylates.

5. Inclusion resin according to claim 2 wherein the proportion of water insoluble polymeric substance to cyclodextrin is from about 1:1 to about 100:1, by weight.

6. Method of producing a water insoluble inclusion resin, which comprises reacting cyclodextrin at a temperature of about 30–90° C. with a bifunctional compound capable of reacting with and cross linking the hydroxyl groups of a carbohydrate.

7. Method according to claim 6 wherein said bifunctional compound is selected from the group consisting of epichlorohydrin, dichlorohydrin, diepoxy-butane, diepoxypropyl ether and ethylene glycol diepoxy-propyl ether.

8. Method according to claim 6 wherein said bifunctional compound is formaldehyde and wherein the weight ratio of said formaldehyde to said cyclodextrin is from 0.25:1 to 10:1.

9. Method which comprises dissolving a water insoluble polymer in a solvent therefor which is inert to cyclodextrin and dispersing cyclodextrin in the thus formed solution; and removing the solvent from said solution, thereby obtaining said water insoluble polymer having said cyclodextrin embedded in the matrix thereof, the thus obtained substance acting as a water insoluble inclusion resin.

10. Method according to claim 9 wherein said polymer is selected from the group consisting of polyamides, polyvinyl acetate, epoxy resins, nitrocellulose, acetyl cellulose, ethyl cellulose, polyacrylamide, polymethacrylamide, polyacrylates and polymethacrylates.

11. Method which comprises dispersing cyclodextrin in a polymerizable monomer inert with respect to said cyclodextrin and being adapted to polymerize into a water insoluble polymer, and causing polymerization of said monomer, thereby obtaining a water insoluble polymer having said cyclodextrin embedded within the matrix thereof.

12. Method for the selective separation of a substance from other substance, which comprises contacting a mixture of said substances with a water insoluble inclusion resin of claim 6 the molecular shape of which is specific for including therein one of said substances, thereby separating said one of said substances from the other substances.

13. Method for the selective separation of a substance from other substance, which comprises contacting a mixture of said substances with a water insoluble inclusion resin of claim 3 the molecular shape of which is specific for including therein one of said substances, thereby separating said one of said substances from the other substances.

14. Method for the selective separation of a substance from other substance, which comprises contacting a mixture of said substances with a water insoluble inclusion resin of claim 6 the molecular shape of which is specific for including therein one of said substances, thereby separating said one of said substances from the other substances.

References Cited

UNITED STATES PATENTS

| | | | |
|---|---|---|---|
| 3,275,576 | 9/1966 | Flodin | 260—233.3 |
| 3,277,025 | 10/1966 | Flodin | 260—233.3 |
| 2,989,521 | 6/1961 | Senti | 260—233.3 |
| 2,973,243 | 2/1961 | Kudera. | |
| 2,801,184 | 7/1957 | Miyamoto | 260—233.3 |
| 3,282,870 | 11/1966 | Harmer | 260—17.4 |
| 2,977,356 | 3/1961 | Commerford | 260—233.3 |
| 2,999,032 | 9/1961 | Dekker | 260—233.3 |

OTHER REFERENCES

Kerr, Chemistry and Industry of Starch, 1950, pp. 354 464–472, 600, 294 and 364.

Katzbeck, J. American Chem. Soc., vol. 72, 1950, pp. 3208–3211.

MORRIS LIEBMAN, *Primary Examiner.*

L. T. JACOBS, *Assistant Examiner.*

U.S. Cl. X.R.

260—622, 326.14, 518, 874, 830, 705, 233.3; 106—169